United States Patent
Osada et al.

(10) Patent No.: US 11,742,517 B2
(45) Date of Patent: Aug. 29, 2023

(54) ALL-SOLID-STATE BATTERY

(71) Applicant: Toyota Jidosha Kabushiki Kaisha, Toyota (JP)

(72) Inventors: Naoki Osada, Toyota (JP); Heidy Hodex Visbal Mendoza, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 240 days.

(21) Appl. No.: 17/178,500

(22) Filed: Feb. 18, 2021

(65) Prior Publication Data

US 2021/0265656 A1 Aug. 26, 2021

(30) Foreign Application Priority Data

Feb. 21, 2020 (JP) .................................. 2020-028071

(51) Int. Cl.
*H01M 10/0562* (2010.01)
*H01M 10/0525* (2010.01)
*H01M 10/0585* (2010.01)

(52) U.S. Cl.
CPC ... *H01M 10/0562* (2013.01); *H01M 10/0525* (2013.01); *H01M 10/0585* (2013.01); *H01M 2300/008* (2013.01)

(58) Field of Classification Search
CPC ......... H01M 10/0562; H01M 10/0585; H01M 10/0525; H01M 2300/008
See application file for complete search history.

(56) References Cited

U.S. PATENT DOCUMENTS

| 2018/0301746 A1* | 10/2018 | Ose ....................... H01M 4/386 |
| 2019/0157710 A1* | 5/2019 | Makino ............... H01M 4/1395 |
| 2020/0373612 A1 | 11/2020 | Yamada et al. |

FOREIGN PATENT DOCUMENTS

| EP | 3016198 A1 * | 5/2016 | ............. C03C 10/00 |
| EP | 3726635 A1 | 10/2020 | |
| JP | 2004-082395 A | 3/2004 | |
| JP | 2009-004133 A | 1/2009 | |
| JP | 2018-152290 A | 9/2018 | |
| JP | 6595153 B1 | 10/2019 | |
| WO | 2019176895 A1 | 9/2019 | |

* cited by examiner

*Primary Examiner* — Christopher P Domone
*Assistant Examiner* — Jonathan William Estes
(74) *Attorney, Agent, or Firm* — Dinsmore & Shohl LLP

(57) ABSTRACT

The all-solid-state battery includes a positive electrode layer, a separator layer, and a negative electrode layer. The separator layer includes a sulfide solid electrolyte. In a cross section parallel to the thickness direction of the separator layer, a line analysis is performed by SEM-EDX to measure an atom concentration of sulfur and an atom concentration of iodine on a straight line extending from the negative electrode layer to the positive electrode layer in parallel to the thickness direction. A regression line is derived from the results of the line analysis, and the regression line has a slope of 0.019 to 0.036. The independent variable of the regression line is a position in the thickness direction of the separator layer. The dependent variable of the regression line is a ratio of the atom concentration of iodine to the atom concentration of sulfur.

3 Claims, 2 Drawing Sheets

ALL-SOLID-STATE BATTERY

CROSS REFERENCE TO RELATED APPLICATIONS

This nonprovisional application claims priority to Japanese Patent Application No. 2020-028071 filed on Feb. 21, 2020 with the Japan Patent Office, the entire contents of which are hereby incorporated by reference.

BACKGROUND

Field

The present disclosure relates to an all-solid-state battery.

Description of the Background Art

WO2019/176895 discloses a kind of sulfide solid electrolyte particles containing lithium, phosphorus, sulfur and halogen.

SUMMARY

In a liquid battery, a separator and an electrolytic solution are interposed between a positive electrode and a negative electrode. The separator is, for example, a polymer microporous membrane or the like. The separator physically separates the positive electrode and the negative electrode. The electrolytic solution is soaked in the separator. The electrolytic solution forms an ion conduction path between the positive electrode and the negative electrode.

In an all-solid-state battery, a solid electrolyte is interposed between the positive electrode and the negative electrode. The solid electrolyte serves as a separator as well as an ion conduction pathway. The ionic conductivity of a solid electrolyte is one of factors that dictate the battery resistance of an all-solid-state battery.

An all-solid-state battery that is filled with a sulfide solid electrolyte has been researched. The sulfide solid electrolyte has high ionic conductivity. Further, it is expected that the addition of lithium halide to the sulfide solid electrolyte may improve the ionic conductivity. However, there is still a room for improving the battery resistance of an all-solid-state battery.

An object of the present disclosure is to reduce battery resistance.

Hereinafter, the technical configuration and effects of the present disclosure will be described. It should be noted that the action mechanism according to the present disclosure includes presumption. The scope of claims is not limited by whether or not the action mechanism is correct.

[1] An all-solid-state battery includes a positive electrode layer, a separator layer, and a negative electrode layer. The separator layer is interposed between the positive electrode layer and the negative electrode layer. The separator layer includes a sulfide solid electrolyte.

The sulfide solid electrolyte has a composition represented by the following formula (1):

$$v\text{LiI-}w\text{LiBr-}(100\text{-}v\text{-}w)(\text{Li}_2\text{S—P}_2\text{S}_5) \quad (1).$$

In the above formula (1),

"v" represents an amount of substance fraction in percentage of a component derived from LiI, and satisfies the relationship of "$10 \leq v \leq 20$", "w" represents an amount of substance fraction in percentage of a component derived from LiBr, and satisfies the relationship of "$0 \leq w \leq 15$", and "(100-v-w)" represents an amount of substance fraction in percentage of a component derived from $\text{Li}_2\text{S—P}_2\text{S}_5$.

In a cross section parallel to the thickness direction of the separator layer, a line analysis is performed by a scanning electron microscope-energy dispersive X-ray spectroscopy to measure an atom concentration of sulfur and an atom concentration of iodine on a straight line extending from the negative electrode layer to the positive electrode layer in parallel to the thickness direction, and from the results of the line analysis, a regression line represented by the following formula (2) is derived:

$$y=ax+b \quad (2),$$

and the regression line has a slope from 0.019 to 0.036.

in the above formula (2),

"x" represents an independent variable, "x" represents a position in the thickness direction, a position of an interface between the separator layer and the negative electrode layer in the thickness direction is defined as "x=0", and a position of an interface between the separator layer and the positive electrode layer in the thickness direction is defined as "x=1", "y" represents a dependent variable, "y" is a ratio of the atom concentration of iodine to the atom concentration of sulfur at the position "x", "a" represents a slope of the regression line, and "b" represents an intercept of the regression line.

The separator layer of the present disclosure includes a sulfide solid electrolyte. The sulfide solid electrolyte includes iodine. The iodine is derived from lithium iodide (LiI) added to the sulfide solid electrolyte. If iodine is uniformly dispersed in the sulfide solid electrolyte, the ionic conduction in the separator layer becomes uniform, which may reduce the battery resistance.

However, according to the new findings of the present disclosure, the battery resistance may be reduced if iodine is distributed in a specific concentration distribution along the thickness direction of the separator layer.

In the present disclosure, the concentration distribution of iodine is determined by SEM-EDX (Scanning Electron Microscope-Energy Dispersive X-ray Spectroscopy). Specifically, in a cross section parallel to the thickness direction of the separator layer, a line analysis is performed by SEM-EDX on a straight line extending from the negative electrode layer toward the positive electrode layer. In the line analysis, the atom concentration of sulfur (S) and the atom concentration of iodine (I) are measured.

A position on the straight line where the line analysis is performed is represented by "x". At each measurement position, a ratio "y" of the atom concentration of iodine to the atom concentration of sulfur is determined. A regression analysis is performed on "x" and "y", and thereby a regression line represented by the above formula (2) "y=ax+b" is derived.

"a" represents a slope of the regression line. "a" indicates the concentration gradient of iodine in the thickness direction. The smaller the value of "a" is, the more uniform the concentration distribution of iodine will be. When "a" is a positive value, the concentration of iodine increases from the negative electrode layer toward the positive electrode layer. The larger the value of "a" is, the steeper the iodine concentration gradient will be.

Although the detailed mechanism is not clear, if "a" satisfies the relationship of "$0.019 \leq a \leq 0.036$", the battery resistance may be reduced.

[2] A first region and a second region are defined in an x-y coordinate system determined by "x" and "y" in the above formula (2). In the first region, "x" satisfies the relationship of "0≤x≤0.5", and in the second region, "x" satisfies the relationship of "0.5≤x≤1.0". In this case, "y1" and "v" may satisfy a relationship represented by the following formula (3):

$$0.0069v-0.015 \leq y1 \leq 0.0095v-0.026 \quad (3)$$

In the above formula (3), "y1" represents an arithmetic mean value of a group of measurement points "y" included in the first region, and "v" represents an amount of substance fraction in percentage of a component derived from LiI in the above formula (1)

Although the detailed mechanism is not clear, if "y1" and "v" satisfy the relationship represented by the above formula (3), the battery resistance may be further reduced.

[3] "y1" and "y2" may satisfy a relationship represented by the following formula (4):

$$1.13 \leq y2/y1 \leq 1.18 \quad (4).$$

In the above formula (4), "y1" represents an arithmetic mean value of a group of measurement points "y" included in the first region, and "y2" represents an arithmetic mean value of a group of measurement points "y" included in the second region.

Although the detailed mechanism is not clear, if "y1" and "y2" satisfy the relationship represented by the above formula (4), the battery resistance may be further reduced.

The foregoing and other objects, features, aspects and advantages of the present disclosure will become more apparent from the following detailed description of the present disclosure when taken in conjunction with the accompanying drawings.

DETAILED DESCRIPTION

Hereinafter, an embodiment of the present disclosure (which may be referred to as the present embodiment hereinafter) will be described. It should be noted that the following description does not limit the scope of claims.

In the present disclosure, any geometric term (such as "parallel" or the like) should not be interpreted only in the strict meaning, it should also be interpreted as being substantially in the same state as the strict sense. For example, the term of "parallel" may be interpreted as denoting a state somewhat offset from the strict meaning of parallel.

In the present disclosure, for example, an expression such as "0.1 parts by mass to 10 parts by mass" or the like indicates a range that includes both boundary values unless otherwise specified. For example, "0.1 parts by mass to 10 parts by mass" indicates a range of "0.1 parts by mass or more and 10 parts by mass or less".

<All-Solid-State Battery>

Figure 1:
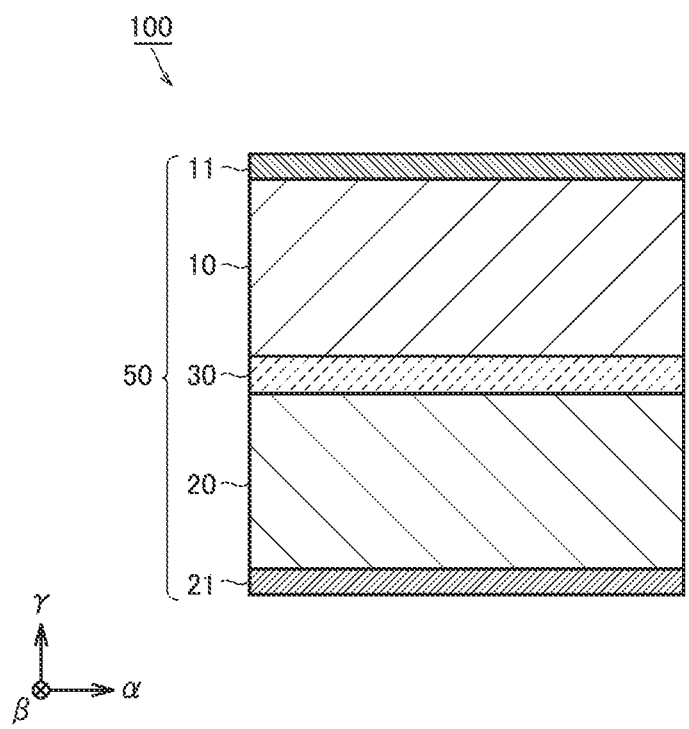
FIG. 1 is a schematic cross-sectional view illustrating an all-solid-state battery according to the present embodiment.

FIG. 1 is a schematic cross-sectional view illustrating an all-solid-state battery according to the present embodiment.

<<Exterior Case>>>

The all-solid-state battery 100 includes an exterior case (not shown). The exterior case houses therein a battery element 50. In other words, the all-solid-state battery 100 includes a battery element 50. The exterior case may be, for example, a metal case or the like. The exterior case may be, for example, a pouch made of an aluminum (Al)-laminated film.

<<Battery Element>>

The battery element 50 includes a positive electrode layer 10, a separator layer 30, and a negative electrode layer 20. In other words, the all-solid-state battery 100 includes a positive electrode layer 10, a separator layer 30, and a negative electrode layer 20. The all-solid-state battery 100 may include only a single battery element 50. The all-solid-state battery 100 may include a plurality of battery elements 50. The plurality of battery elements 50 may be stacked in the thickness direction (y-axis direction in FIG. 1), for example. The plurality of battery elements 50 may be electrically connected in series. The plurality of battery elements 50 may be electrically connected in parallel.

The battery element 50 may further include a positive electrode current collector 11. The positive electrode current collector 11 is bonded to the positive electrode layer 10. The positive electrode current collector 11 may include, for example, an Al foil or the like. The positive electrode current collector 11 may have a thickness of, for example, 5 μm to 50 μm.

The battery element 50 may further include a negative electrode current collector 21. The negative electrode current collector 21 is bonded to the negative electrode layer 20. The negative electrode current collector 21 may include, for example, a nickel (Ni) foil, a copper (Cu) foil, or the like. The negative electrode current collector 21 may have a thickness of, for example, 5 μm to 50 μm.

<<Separator Layer>>

The separator layer 30 is interposed between the positive electrode layer 10 and the negative electrode layer 20. The separator layer 30 physically separates the positive electrode layer 10 and the negative electrode layer 20. The separator layer 30 blocks the transition of electrons between the positive electrode layer 10 and the negative electrode layer 20. The separator layer 30 forms an ion conduction path between the positive electrode layer 10 and the negative electrode layer 20.

(Thickness)

The separator layer 30 may have an arbitrary thickness. The separator layer 30 may have a thickness of, for example, 1 μm to 100 μm. The separator layer 30 may have a thickness of, for example, 5 μm to 50 μm. The separator layer 30 may have a thickness of, for example, 10 μm to 30 μm.

(Binder)

The separator layer 30 includes a sulfide solid electrolyte. In some embodiments, the separator layer 30 may consist essentially of the sulfide solid electrolyte. The separator layer 30 may further include a binder, for example. The binder bonds the solid materials together. The amount of the binder to be added may be, for example, 0.01 parts by mass to 10 parts by mass relative to 100 parts by mass of the sulfide solid electrolyte. The amount of the binder to be added may be, for example, 0.1 parts by mass to 5 parts by mass based on 100 parts by mass of the sulfide solid electrolyte. The binder may include any component. The binder may include, for example, at least one selected from the group consisting of polyvinylidene fluoride (PVdF), vinylidene fluoride-hexafluoropropylene copolymer (PVdF-HFP), isobutylene-isoprene rubber (IIR), and butadiene rubber (BR).

(Sulfide Solid Electrolyte)

The sulfide solid electrolyte may be, for example, a powder material. The sulfide solid electrolyte may have a median diameter of, for example, 0.1 μm to 10 μm. In the present embodiment, the median diameter refers to a particle size in volume-based particle size distribution at which the cumulative particle volume accumulated from the side of small sizes reaches 50% of the total particle volume. The sulfide solid electrolyte may have a median diameter of, for example, 1 μm to 5 μM.

The sulfide solid electrolyte may have a glassy state, for example. The sulfide solid electrolyte may be formed into glass ceramics (also referred to as "crystallized glass"), for example. The sulfide solid electrolyte may include lithium (Li), sulfur (S), phosphorus (P) and iodine (I). The sulfide solid electrolyte may further include bromine (Br).

The sulfide solid electrolyte may be synthesized by a mechanochemical method. For example, raw materials may be mixed by a planetary ball mill or the like. In the mechanochemical method, mechanical energy is applied to the mixture so as to make the mixture uniform and glassy. The glassy mixture may be subjected to an appropriate heat treatment to obtain the glass ceramics.

The composition of the sulfide solid electrolyte is represented by an amount of substance fraction (also referred to as "molar fraction") of the raw material. The raw material includes lithium-phosphorous sulfide ($Li_2S$—$P_2S_5$) and lithium halide (LiI, LiBr).

The sulfide solid electrolyte has a composition represented by the following formula (1):

$$vLiI\text{-}wLiBr\text{-}(100\text{-}v\text{-}w)(Li_2S\text{—}P_2S_5) \quad (1)$$

In the above formula (1), "v" represents an amount of substance fraction in percentage of a component derived from lithium iodide (LiI). "v" satisfies the relationship of "10≤v≤20". For example, "v=10" indicates that the amount of substance fraction of LiI is 10 mol % relative to the whole raw material. "v" may satisfy the relationship of "10≤v≤15", for example. "v" may satisfy the relationship of "15≤v≤20", for example.

"w" indicates an amount of substance fraction in percentage of a component derived from lithium bromide (LiBr). "w" satisfies the relationship of "0≤w≤15". For example, "w=10" indicates that the amount of substance fraction of LiBr is 10 mol % relative to the whole raw material. "w" may satisfy the relationship of "0≤w≤10", for example. "w" may satisfy the relationship of "10≤w≤15", for example.

"(100-v-w)" represents an amount of substance fraction in percentage of a component derived from lithium-phosphorous sulfide ($Li_2S$—$P_2S_5$). For example, if "v=w=10", the amount of substance fraction of $Li_2S$—$P_2S_5$ is 80 mol % relative to the entire raw material. For example, "(100-v-w)" may satisfy the relationship of "65≤(100-v-w)≤90". For example, "(100-v-w)" may satisfy the relationship of "70≤(100-v-w)≤80".

The solid electrolyte material may include, for example, at least one selected from the group consisting of 10LiI-10LiBr-80($Li_2S$—$P_2S_5$), 15LiI-5LiBr-80($Li_2S$—$P_2S_5$), 20LiI-80($Li_2S$—$P_2S_5$), 10LiI-15LiBr-75($Li_2S$—$P_2S_5$), 15LiI-10LiBr-75($Li_2S$—$P_2S_5$), 20LiI-5LiBr-75($Li_2S$—$P_2S_5$), 15LiI-15LiBr-70($Li_2S$—$P_2S_5$), and 20LiI-10LiBr-70 ($Li_2S$—$P_2S_5$).

The lithium-phosphorous sulfide ($Li_2S$—$P_2S_5$) may be produced from a mechanochemical reaction between lithium sulfide ($Li_2S$) and phosphorus pentasulfide ($P_2S_5$). The lithium-phosphorous sulfide may have a composition such as $Li_3PS_4$, $Li_4P_2S_6$, or $Li_7P_3S_{11}$.

The composition of lithium-phosphorous sulfide may also be represented by the amount of substance fraction of the raw material. In the present embodiment, the mixing ratio of $Li_2S$ and $P_2S_5$ is arbitrary. For example, "0.75$Li_2S$-0.25$P_2S_5$" indicates that the amount of substance fraction of a component derived from $Li_2S$ is 0.75 relative to the entire raw material of lithium-phosphorous sulfide, and the amount of substance fraction of a component derived from $Li_2S$ is 0.25 relative to the entire raw material of lithium-phosphorous sulfide.

The composition of lithium-phosphorous sulfide may be represented by, for example, the following formula (5):

$$uLi_2S\text{-}(1\text{-}u)P_2S_5 \quad (5)$$

In the above formula (5), "u" represents an amount of substance fraction of a component derived from $Li_2S$, and "(1-u)" represents an amount of substance fraction of a component derived from $P_2S_5$. "u" may satisfy a relationship of "0.5≤u≤0.9", for example. "u" may satisfy the relationship of "0.6≤u≤0.8", for example. "u" may satisfy the relationship of "0.7≤u≤0.8", for example.

The lithium-phosphorous sulfide may include, for example, at least one selected from the group consisting of 0.5$Li_2S$-0.5$P_2S_5$, 0.6$Li_2S$-0.4$P_2S_5$, 0.65$Li_2S$-0.35$P_2S_5$, 0.70$Li_2S$-0.30$P_2S_5$, 0.75$Li_2S$-0.25$P_2S_5$, 0.80$Li_2S$-0.20$P_2S_5$, 0.85$Li_2S$-0.15$P_2S_5$, and 0.90$Li_2S$-0.10$P_2S_5$.

(Concentration Distribution of Iodine)

In the present embodiment, iodine is distributed in the separator layer 30 in a specific concentration distribution. The concentration distribution of iodine may be measured by the following procedure.

First, the exterior case is removed in an inert gas atmosphere to recover the battery element 50. Then, the battery element 50 is cut into an appropriate size. The cross section is substantially parallel to the thickness direction of the separator layer 30. The cross section is treated by an ion milling apparatus or the like. The cross section is treated in a vacuum atmosphere or an inert gas atmosphere. While the cross section is being treated, the workpiece may be cooled. Thus, a sample piece is prepared.

After the cross section is treated, the sample piece is introduced into an SEM. The sample piece is maintained in the vacuum atmosphere without being exposed to outside air before it is introduced into the SEM. In the present embodiment, the SEM is connected with an EDX apparatus.

The sample piece is observed under the SEM. In other words, the cross section parallel to the thickness direction of the separator layer 30 is observed under the SEM. The observation magnification is adjusted in such a manner that the entire separator layer 30 is positioned in the observation field of view at a proportion as high as possible. Further, the observation position is adjusted in such a manner that an interface between the separator layer 30 and the negative electrode layer 20 and an interface between the separator layer 30 and the positive electrode layer 10 are located at both ends of the observation field of view. The observation magnification may be, for example, about 500 to 5000 times.

Figure 2:
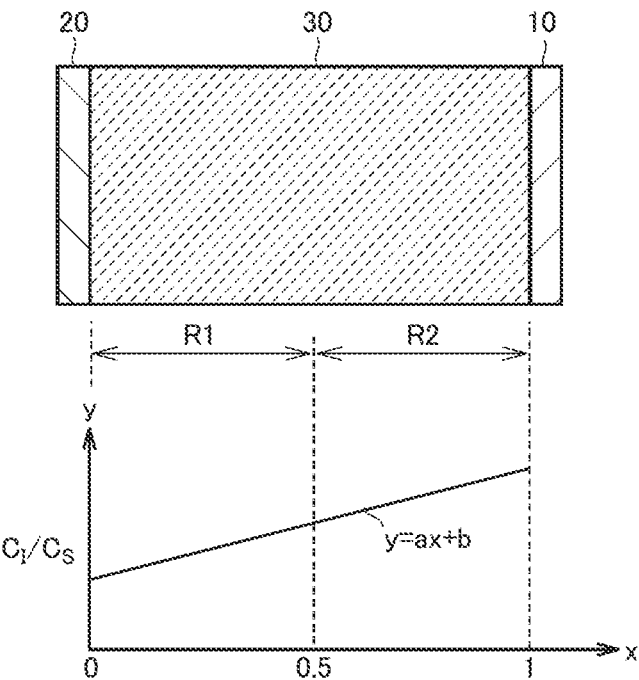
FIG. 2 is an explanatory diagram of a regression analysis.

FIG. 2 is an explanatory diagram of a regression analysis.

A line analysis is performed on the separator layer 30 in the x-axis direction of FIG. 2. In other words, a line scan is performed on a straight line extending from the negative electrode layer 20 toward the positive electrode layer 10 substantially parallel to the thickness direction of the separator layer 30. The acceleration voltage is 10 kV. The atom concentration of sulfur $C_S$ (atom %) and the atom concentration of iodine $C_I$ (atom %) are measured by the multi-element simultaneous measurement.

A position in the thickness direction is represented by "x" (a dimensionless parameter). The position of an interface between the separator layer 30 and the negative electrode layer 20 in the thickness direction is defined as "x=0", and the position of an interface between the separator layer 30 and the positive electrode layer 10 in the thickness direction is defined as "x=1". In a range of "0≤x≤1", a number of 100 to 300 measurement points (for example, 200 measurement points) are set at equal intervals. The ratio "y" (y is a dimensionless parameter, and y=$C_I/C_S$) of the atom concentration of iodine to the atom concentration of sulfur is measured at each measurement point.

The measurement results are plotted on an x-y coordinate system with "x" as an independent variable and "y" as a dependent variable. Based on the measurement results, a regression line is derived by the least squares method.

The regression line is represented by the following formula (2):

$$y=ax+b \quad (2).$$

In the above formula (2), "x" represents a position in the thickness direction, "y" represents a ratio of the atom concentration of iodine to the atom concentration of sulfur at the position of "x", "a" (a dimensionless parameter) represents a slope of the regression line, and "b" (a dimensionless parameter) represents an intercept of the regression line.

The line analysis is performed at five locations or more. The interval between adjacent analysis locations (i.e., the adjacent straight lines) is 1 μm or more. A regression line is derived from the results of each line analysis. In other words, five slopes are obtained. The arithmetic mean value of the five slopes is defined as the slope in the present embodiment. The slope is effective up to the third decimal place. Any figure after the fourth decimal place is rounded off.

In the present embodiment, the regression line has a slope of 0.019 to 0.036. Although the detailed mechanism is not clear, when the slope is 0.019 or more and 0.036 or more, the battery resistance is reduced. The regression line may have a slope of, for example, 0.019 to 0.034. The regression line may have a slope of, for example, 0.019 to 0.029.

The regression line may have an arbitrary intercept. The regression line may have an intercept of, for example, 0.02 to 0.1. The regression line may have an intercept of, for example, 0.04 to 0.08. The regression line may have an intercept of, for example, 0.04 to 0.06.

As illustrated in FIG. 2, a first region R1 and a second region R2 may be defined in the x-y coordinate system. In the first region, "x" satisfies the relationship of "0≤x≤0.5". In the second region, "x" satisfies the relationship of "0.5<x≤1.0".

Further, in the present embodiment, "y1" and "v" may satisfy a relationship represented by the following formula (3):

$$0.0069v-0.015 \le y1 \le 0.0095v-0.026 \quad (3)$$

In the above formula (3), "y1" represents an arithmetic mean value of a group of measurement points "y" included in the first region, and "v" represents an amount of substance fraction in percentage of a component derived from LiI in the above formula (1). In other words, "v" satisfies the relationship of "10≤v≤20". Although the detailed mechanism is not clear, when the relationship represented by the above formula (3) is satisfied, the battery resistance is reduced.

Figure 3:
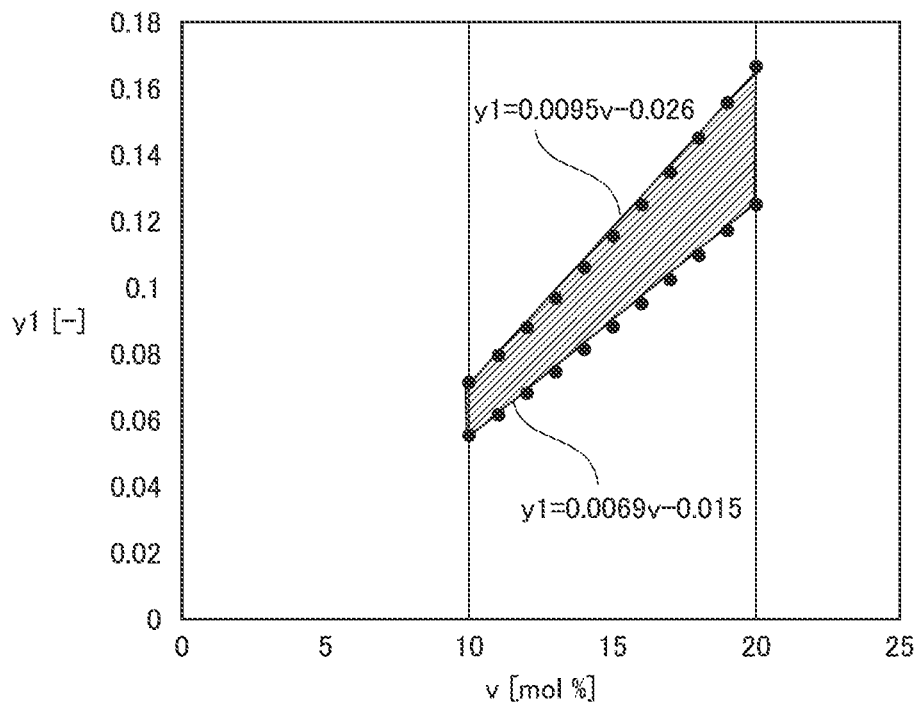
FIG. 3 is a graph illustrating a formula (3)

FIG. 3 is a graph illustrating the formula (3).

The horizontal axis in FIG. 3 is "v", and the vertical axis in FIG. 3 is "y1". In FIG. 3, the relationship of the above formula (3) is satisfied in a quadrangle region surrounded by a straight line represented by the formula of "y1=0.00069v−0.015", a straight line represented by the formula of "y1=0.00095v-0.026", a straight line represented by the formula of "v=10", and a straight line represented by the formula of "v=20". "y1" may be, for example, 0.060 to 0.113. "y1" may be, for example, 0.064 to 0.100.

Further, in the present embodiment, "y1" and "y2" may satisfy a relationship represented by the following formula (4):

$$1.13 \le y2/y1 \le 1.18 \quad (4)$$

In the above formula (4), "y1" represents an arithmetic mean value of a group of measurement points "y" included in the first region, and "y2" represents an arithmetic mean value of a group of measurement points "y" included in the second region. "y2/y1" represents a ratio of "y2" to "y1". "y2/y1" is effective up to the third decimal place. Any figure after the fourth decimal place is rounded off. Although the detailed mechanism is not clear, when the relationship represented by the above formula (4) is satisfied, the battery resistance is reduced. "y2" may be, for example, 0.071 to 0.128.

(Formation of Density Distribution)

The concentration distribution of iodine in the separator layer 30 may be formed by any method. For example, the separator layer 30 may be formed by coating a paste into a coating film. The paste may be prepared by dispersing the sulfide solid electrolyte in a predetermined dispersion medium. For example, the concentration gradient of iodine in the coating film (the separator layer 30) may be changed by changing the length of waiting time from the preparation of the paste to the coating thereof. The waiting time may be, for example, 3 hours to 15 hours. For example, the waiting time may be changed appropriately in response to the thickness of the separator layer 30.

For example, the separator layer 30 may be formed by stacking a plurality of unit layers. For example, the amount of LiI to be added to the sulfide solid electrolyte may be changed in each unit layer. For example, the concentration gradient of iodine may be formed in the thickness direction of the separator layer 30 by gradually increasing the amount of LiI to be added to each unit layer.

<<Positive Electrode Layer>>

The positive electrode layer 10 is bonded to the separator layer 30. The positive electrode layer 10 may have a thickness of, for example, 10 μm to 200 μm. The positive electrode layer 10 may have a thickness of, for example, 50 μm to 100 μm. The positive electrode layer 10 includes a positive electrode active material.

The positive electrode layer 10 may further include, for example, a sulfide solid electrolyte, a conductive material, and a binder. The positive electrode active material may be, for example, a powder material. The positive electrode active material may have a median diameter of, for example, 1 μm to 30 μm.

The positive electrode active material is capable of storing and releasing Li. The positive electrode active material may include any component. The positive electrode active material may include at least one selected from the group consisting of lithium cobalt oxide, lithium nickel oxide, lithium manganese oxide, lithium nickel cobalt manganese oxide (such as $LiNi_{1/3}Co_{1/3}Mn_{1/3}O_2$), lithium nickel cobalt aluminate, and lithium iron phosphate, for example. The positive electrode active material may be subjected to a surface treatment. A buffer layer may be formed by the surface treatment on the surface of the positive electrode active material. The buffer layer may include lithium niobate ($LiNbO_3$), for example. The buffer layer may inhibit the formation of a Li depletion layer, which thereby reduces the battery resistance.

The detail of the sulfide solid electrolyte is the same as that described in the above. The sulfide solid electrolyte contained in the positive electrode layer 10 and the sulfide solid electrolyte contained in the separator layer 30 may have the same composition or different compositions. The amount of the sulfide solid electrolyte to be added may be, for example, 1 part by mass to 100 parts by mass relative to 100 parts by mass of the positive electrode active material.

The conductive material forms an electron conduction path. The amount of the conductive material to be added may be, for example, 0.1 parts by mass to 10 parts by mass relative to 100 parts by mass of the positive electrode active material. The conductive material may include any component. The conductive material may include at least one selected from the group consisting of vapor grown carbon fibers (VGCF), carbon nanotubes (CNT), carbon blacks, and graphene flakes, for example.

The detail of the binder is the same as that described in the above. The binder contained in the positive electrode layer 10 and the binder contained in the separator layer 30 may have the same composition or different compositions. The amount of the binder to be added may be, for example, 0.1 parts by mass to 10 parts by mass relative to 100 parts by mass of the positive electrode active material.

<<Negative Electrode Layer>>

The negative electrode layer 20 is bonded to the separator layer 30. The negative electrode layer 20 may have a thickness of, for example, 10 μm to 200 μm. The negative electrode layer 20 may have a thickness of, for example, 50 μm to 100 μm.

The negative electrode layer 20 includes a negative electrode active material. The negative electrode layer 20 may further include, for example, a sulfide solid electrolyte, a conductive material, and a binder. The negative electrode active material may be, for example, a powder material. The negative electrode active material may have a median diameter of, for example, 1 μm to 30 μm.

The negative electrode active material is capable of storing and releasing Li. The negative electrode active material may include any component. The negative electrode active material may include at least one selected from the group consisting of lithium titanium oxide, graphite, hard carbon, soft carbon, Si, silicon oxide, any silicon-based alloy, Sn, tin oxide, and any tin-based alloy, for example.

The detail of the sulfide solid electrolyte is the same as that described in the above. The sulfide solid electrolyte contained in the negative electrode layer 20 and the sulfide solid electrolyte contained in the separator layer 30 may have the same composition or different compositions. The amount of the sulfide solid electrolyte to be added may be, for example, 1 part by mass to 100 parts by mass relative to 100 parts by mass of the negative electrode active material.

The detail of the conductive material is the same as that described in the above. The conductive material contained in the negative electrode layer 20 and the conductive material contained in the positive electrode layer 10 may have the same composition or different compositions. The amount of the conductive material to be added may be, for example, 0.1 parts by mass to 10 parts by mass relative to 100 parts by mass of the negative electrode active material.

The detail of the binder is the same as that described in the above. The binder contained in the negative electrode layer 20 and the binder contained in the separator layer 30 may have the same composition or different compositions. The amount of the binder to be added may be, for example, 0.1 parts by mass to 10 parts by mass relative to 100 parts by mass of the negative electrode active material.

Examples

Next, examples according to the present disclosure (hereinafter also referred to as "the present example") will be described. It should be noted that the following description does not limit the scope of claims.

<Production of All-solid-state Battery>

Test batteries No. 1 to No. 6 were produced by the following procedure. The sulfide solid electrolyte used in the present example was glass ceramics. More specifically, lithium-phosphorous sulfide ($Li_2S$—$P_2S_5$) in the present example was $0.75Li_2S$-$0.25P_2S_5$.

<<1. Formation of Negative Electrode Layer>>

The following materials were prepared:
negative electrode active material: lithium titanium oxide;
sulfide solid electrolyte: $10LiI$-$10LiBr$-$80(Li_2S$—$P_2S_5)$;
conductive material: VGCF;
binder solution: PVdF (solute) solved in butyl butyrate (solvent) at a concentration of 5% by mass; and
dispersion medium: butyl butyrate.

A polypropylene (PP) vessel was prepared. The materials mentioned above were placed in the PP vessel at a predetermined blending ratio. The materials in the PP vessel was stirred for 30 seconds by an ultrasonic disperser. After stirring, the PP vessel was placed in a shaker. The PP vessel was shaken by the shaker for 30 minutes. Thus, a first paste was prepared.

An Ni foil was prepared as the negative electrode current collector. The first paste was coated on the surface of the negative electrode current collector by using a film applicator (a doctor blade). The first paste was dried on a hot plate for 30 minutes. The temperature of the hot plate was set at 100° C. Thus, a negative electrode layer was formed on the surface of the negative electrode current collector.

<<2. Formation of Positive Electrode Layer>>

The following materials were prepared:
positive electrode active material: $LiNi_{1/3}Co_{1/3}Mn_{1/3}O_2$, $LiNbO_3$;
sulfide solid electrolyte: $10LiI$-$10LiBr$-$80(Li_2S$—$P_2S_5)$;
conductive material: VGCF;
binder solution: PVdF (solute) solved in butyl butyrate (solvent) at a concentration of 5% by mass; and
dispersion medium: butyl butyrate The surface of particles $LiNi_{1/3}Co_{1/3}Mn_{1/3}O_2$ was coated with $LiNbO_3$ to form a buffer layer. Thus, a positive electrode active material was prepared.

A PP vessel was prepared. The materials mentioned above were placed in the PP vessel at a predetermined blending ratio. The materials in the PP vessel were stirred for 30 seconds by an ultrasonic disperser. After stirring, the PP vessel was placed in a shaker. The PP vessel was shaken by the shaker for 30 minutes. Thus, a second paste was prepared.

An Al foil was prepared as a temporary support. The second paste was coated on the surface of the temporary support by using a film applicator (a doctor blade). The second paste was dried on a hot plate for 30 minutes. The temperature of the hot plate was set at 100° C. Thus, a positive electrode layer was formed on the surface of the temporary support.

<<3. Formation of Separator Layer>>

The following materials were prepared:

sulfide solid electrolyte: 10LiI-10LiBr-80(Li$_2$S—P$_2$S$_5$);

binder solution: PVdF (solute) solved in butyl butyrate (solvent) at a concentration of 5% by mass; and dispersion medium: butyl butyrate.

A PP vessel was prepared. The materials mentioned above were placed in the PP vessel at a predetermined blending ratio. The materials in the PP vessel were stirred for 30 seconds by an ultrasonic disperser. After stirring, the PP vessel was placed in a shaker. The PP vessel was shaken by the shaker for 30 minutes. Thus, a third paste was prepared.

An Al foil was prepared as a temporary support. The third paste was coated on the surface of the temporary support by using a film applicator (a doctor blade). The third paste was dried on a hot plate for 30 minutes. The temperature of the hot plate was set at 100° C. Thus, a separator layer was formed on the surface of the temporary support.

<<4. Formation of Battery Element>>

The separator layer was bonded to the negative electrode layer to form a first stack body. In the first stack body, the negative electrode current collector (Ni foil), the negative electrode layer, the separator layer, and the temporary support (Al foil) were stacked in this order.

The first stack body was pressed by a roll press apparatus. The pressing temperature was set at 25° C. The linear pressing pressure was 1 ton/cm (1×10$^3$ kg/cm). Thus, the negative electrode layer and the separator layer were bonded to each other. After pressing, the temporary support (Al foil) was peeled off from the separator layer. Thus, a second stack body was formed. In the second stack body, the negative electrode current collector (Ni foil), the negative electrode layer and the separator layer were stacked in this order.

The positive electrode layer was bonded to the separator layer to form a third stack body. In the third stack body, the negative electrode current collector (Ni foil), the negative electrode layer, the separator layer, the positive electrode layer, and the temporary support (Al foil) were stacked in this order.

The third stack body was pressed by a roll press apparatus. The pressing temperature was set at 25° C. The linear pressing pressure was 1 ton/cm. Thus, the separator layer and the positive electrode layer were bonded to each other. After pressing, the temporary support (Al foil) was peeled off from the positive electrode layer. Thus, a battery element was formed. In the battery element, the negative electrode current collector (Ni foil), the negative electrode layer, the separator layer, and the positive electrode layer were stacked in this order.

The battery element was pressed by a roll press apparatus. The pressing temperature was set at 150° C. The linear pressing pressure was 4 ton/cm. Thus, the battery element is densified. After the densification, the positive electrode current collector (Al foil) was bonded to the positive electrode layer. Thereafter, the battery element was sealed in an exterior case (a pouch made of Al-laminated film). Thus, a test battery (all-solid lithium ion battery) was produced.

<<5. Concentration Distribution of Iodine>>

The slope of each regression line represented by the formula (2) was calculated according to the above procedure. The slope "a" is listed in Table 1 below.

(No. 1)

In the process of producing the test battery No. 1, the separator layer was formed as follows.

After the third paste was prepared as described above in "4. Formation of Battery Element", the third paste was left to stand still for 3 hours. After the standing, the third paste was stirred for another 30 seconds by an ultrasonic disperser. Then, the third paste was shaken by a shaker for 30 seconds. Thereafter, the third paste was coated on the surface of the temporary support and dried to form the separator layer.

(No. 2)

In the process of producing the test battery No. 2, the separator layer was formed as follows.

After the third paste was prepared as described above, the third paste was left to stand still for 15 hours. After the standing, the third paste was stirred for another 30 seconds by an ultrasonic disperser. Then, the third paste was shaken by a shaker for 30 seconds. Thereafter, the third paste was coated on the surface of the temporary support and dried to form the separator layer.

(No. 3)

In the process of producing the test battery No. 3, 20LiI-80(Li$_2$S—P$_2$S$_5$) was used as the sulfide solid electrolyte of the separator layer. The test battery No. 3 was produced in the same manner as the test battery No. 2 except that the separator layer was formed of 20LiI-80(Li$_2$S—P$_2$S$_5$).

(No. 4)

In the process of producing the test battery No. 4, 15LiI-15LiBr-70(Li$_2$S—P$_2$S$_5$) was used as the sulfide solid electrolyte of the separator layer. The test battery No. 4 was produced in the same manner as the test battery No. 1 except that the separator layer was formed of 15LiI-15LiBr-70 (Li$_2$S—P$_2$S$_5$).

(No. 5)

In the process of producing the test battery No. 5, the separator layer was formed as follows.

After the third paste was prepared as described above, the third paste was left to stand still for 70 hours. After the standing, the third paste was stirred for another 30 seconds by an ultrasonic disperser. Then, the third paste was shaken by a shaker for 30 seconds. Thereafter, the third paste was coated on the surface of the temporary support and dried to form the separator layer.

(No. 6)

In the process of producing the test battery No. 6, 20LiI-80(Li$_2$S—P$_2$S$_5$) was used as the sulfide solid electrolyte of the separator layer. The test battery No. 6 was produced in the same manner as the test battery No. 5 except that the separator layer was formed of 20LiI-80(Li$_2$S—P$_2$S$_5$).

<Evaluation>

In the present example, "1C" refers to a current at which the full charge capacity of a test battery is completely discharged in one hour. The test battery was set in a charge/discharge apparatus. The state of charge of the test battery was adjusted to 70%. In an environment of room temperature, the test battery was discharged at a discharge current of 7C for a predetermined time. The level of voltage drop during the discharge time was measured. The battery resistance (DC resistance) was calculated by dividing the level of voltage drop by the discharge current. The battery resistance is listed in Table 1 below.

TABLE 1

| | Sulfide solid electrolyte Composition | | Separator layer | | | | | Evaluation |
| | | | Concentration distribution of iodine | | | | | Battery |
| | | | Regression line | First region | | Second region | | resistance |
| | Formula (1): $v$LiI-$w$LiBr-(100-$v$-$w$)(Li$_2$S—P$_2$S$_5$) | | Formula (2): $y = ax + b$ | Arithmetic mean of y | | Arithmetic mean of y | | (DC |
| No. | v (mol %) | w (mol %) | a | y1 | Formula (3) [1] | y2 | Formula (4) [2] | resistance) (Ω) |
| 1 | 10 | 10 | 0.036 | 0.064 | p [3] | 0.085 | f [3] | 15 |
| 2 | 10 | 10 | 0.019 | 0.060 | p | 0.071 | p | 13 |
| 3 | 20 | 0 | 0.029 | 0.113 | f | 0.128 | p | 14 |
| 4 | 15 | 15 | 0.034 | 0.100 | p | 0.118 | p | 15 |
| 5 | 10 | 10 | 0.008 | 0.056 | p | 0.059 | f | 21 |
| 6 | 20 | 0 | 0.010 | 0.109 | f | 0.111 | f | 22 |

[1] Formula (3): $0.0069v-0.015 \leq y1 \leq 0.0095v-0.026$
[2] Formula (4): $1.13 \leq y2/y1 \leq 1.18$
[3] "p" indicates that the corresponding formula is satisfied, and "f" that the corresponding formula is not satisfied.

<Results>

Figure 4:
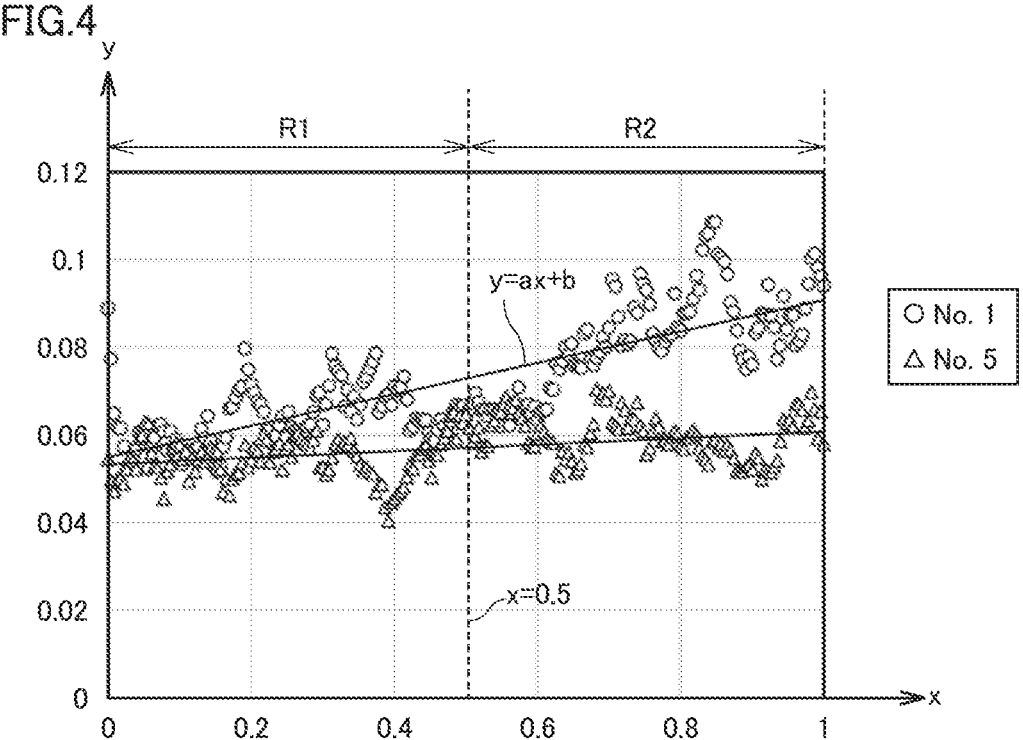
FIG. 4 is a graph illustrating the results of the regression analysis.

FIG. 4 is a graph illustrating the results of the regression analysis.

FIG. 4 illustrates the analysis results of the separator layer in the test battery No. 1 and the separator layer in the test battery No. 5, respectively. The regression line for the test battery No. 1 has a steeper slope than the regression line for the test battery No. 5. As illustrated in Table 1, the slope "a" of the regression line for the test battery No. 1 is 0.036, and the slope "a" of the regression line for the test battery No. 5 is 0.008.

In Table 1, each of the test batteries No. 1 to 4 has a lower battery resistance than each of the test batteries No. 5 and 6. The slope of the regression line for each of the test batteries No. 1 to No. 4 is in a range of 0.019 to 0.036, and the slope of the regression line for each of the test batteries No. 5 and No. 6 is beyond the range of 0.019 to 0.036.

The present embodiment and the present example are illustrative in all respects. The present embodiment and the present example are non-restrictive. For example, it is expected that certain configurations of the present embodiments and the present examples may be optionally combined. The technical scope defined by the terms of the claims encompasses any modifications within the meaning equivalent to the terms of the claims. The technical scope defined by the terms of the claims also encompasses any modifications within the scope equivalent to the terms of the claims.

What is claimed is:

1. An all-solid-state battery comprising:
a positive electrode layer;
a separator layer; and
a negative electrode layer,
wherein the separator layer is interposed between the positive electrode layer and the negative electrode layer,
the separator layer includes a sulfide solid electrolyte,
the sulfide solid electrolyte has a composition represented by the following formula (1):

$$v\text{LiI-}w\text{LiBr-}(100-v-w)(\text{Li}_2\text{S—P}_2\text{S}_5) \tag{1}$$

in the above formula (1),
v represents an amount of substance fraction in percentage of a component derived from LiI, and satisfies a relationship of $10 \leq v \leq 20$,
w represents an amount of substance fraction in percentage of a component derived from LiBr, and satisfies a relationship of $0 \leq w \leq 15$, and
(100-v-w) represents an amount of substance fraction in percentage of a component derived from Li$_2$S—P$_2$S$_5$,
in a cross section parallel to a thickness direction of the separator layer, a line analysis is performed by a scanning electron microscope-energy dispersive X-ray spectroscopy to measure an atom concentration of sulfur and an atom concentration of iodine on a straight line extending from the negative electrode layer to the positive electrode layer in parallel to the thickness direction,
from results of the line analysis, a regression line represented by the following formula (2) is derived:

$$y=ax+b \tag{2},$$

the regression line has a slope from 0.019 to 0.036,
in the above formula (2),
x represents an independent variable,
x represents a position in the thickness direction, and a position of an interface between the separator layer and the negative electrode layer in the thickness direction is defined as x=0, and a position of an interface between the separator layer and the positive electrode layer in the thickness direction is defined as x=1,
y represents a dependent variable,
y is a ratio of the atom concentration of iodine to the atom concentration of sulfur at the position x,
a represents a slope of the regression line, and
b represents an intercept of the regression line.

2. The all-solid-state battery according to claim 1, wherein
a first region and a second region are defined in an x-y coordinate system determined by x and y in the formula (2),
in the first region, x satisfies a relationship of $0 \leq x \leq 0.5$, and
in the second region, x satisfies a relationship of $0.5 < x \leq 1.0$,
y1 and v satisfy a relationship represented by the following formula (3):

$$0.0069v-0.015 \leq y1 \leq 0.0095v-0.026 \tag{3}$$

in the above formula (3),
y1 represents an arithmetic mean value of a group of measurement points y included in the first region, and v represents an amount of substance fraction in percentage of a component derived from LiI in the above formula (1).

3. The all-solid-state battery according to claim 2, wherein y1 and y2 satisfy a relationship represented by the following formula (4):

$$1.13 \leq y2/y1 \leq 1.18 \qquad (4)$$

in the above formula (4), y1 represents an arithmetic mean value of a group of measurement points y included in the first region, and y2 represents an arithmetic mean value of a group of measurement points y included in the second region.

\* \* \* \* \*